US009373128B2

(12) United States Patent  
Verma (10) Patent No.: US 9,373,128 B2  
(45) Date of Patent: Jun. 21, 2016

(54) METHOD AND APPARATUS FOR DETERMINING SIMILARITY INFORMATION FOR USERS OF A NETWORK

(71) Applicant: Telefonaktiebolaget L M Ericsson (publ), Stockholm (SE)

(72) Inventor: Vikas Verma, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 132 days.

(21) Appl. No.: 13/776,127

(22) Filed: Feb. 25, 2013

(65) Prior Publication Data

US 2014/0244664 A1  Aug. 28, 2014

(51) Int. Cl.
*G06F 17/30* (2006.01)
*G06Q 30/02* (2012.01)
*G06Q 50/00* (2012.01)

(52) U.S. Cl.
CPC ............ *G06Q 30/0251* (2013.01); *G06Q 50/01* (2013.01)

(58) Field of Classification Search
CPC .................................................. G06F 17/3053
See application file for complete search history.

(56) References Cited

U.S. PATENT DOCUMENTS

2006/0173961 A1* 8/2006 Turski et al. ............... 709/206
2010/0332270 A1* 12/2010 Richter et al. ................. 705/7
2012/0124060 A1* 5/2012 Muskal .............. G06F 17/30958
                                                           707/748
2012/0166348 A1* 6/2012 Dyagilev et al. .............. 705/319
2013/0212479 A1* 8/2013 Willis et al. .................. 715/736
2014/0122584 A1* 5/2014 Gargi ..................... G06Q 50/01
                                                           709/204

OTHER PUBLICATIONS

Siddharth Kalla, Jun. 10, 2011, Explorable.com: https://explorable.com/range-in-statistics.*

* cited by examiner

*Primary Examiner* — Aleksandr Kerzhner
*Assistant Examiner* — Matthew Ellis
(74) *Attorney, Agent, or Firm* — Patent Portfolio Builders, PLLC (57) ABSTRACT

A method for determining similarity information for users of a network is disclosed. The method comprises constructing a graph from user interaction data, wherein the graph links users of the network according to their interaction, and weighting links between users according to the strength of interaction between the users. The method further comprises, for each of a plurality of users, identifying from among the other users with whom the user interacts: a maximum similarity user to whom the user is connected via a maximum weight link, and a minimum similarity user to whom the user is connected via a minimum weight link. Finally the method comprises assembling a plurality of relative similarity triplets, each triplet comprising a user and that user's identified maximum and minimum similarity users.

11 Claims, 3 Drawing Sheets

METHOD AND APPARATUS FOR DETERMINING SIMILARITY INFORMATION FOR USERS OF A NETWORK

TECHNICAL FIELD

The present invention relates to a method and an apparatus for determining similarity information for users of a network. The invention also relates to a computer program product configured to carry out a method for determining similarity information for users of a network.

BACKGROUND

Communication networks are widely used across many industries and sections of society. Such networks may include, for example, telecommunications networks, social media networks, office networks, academia networks and community networks. The use of communication networks is growing, with continual expansion of customer bases driving business growth in this sector.

A competitive business environment ensures that network operators and network service providers are under continuing and significant pressure to improve network performance and increase profit margins. The extraction of information from communication networks is an important factor in enabling active management of network resources in order to meet these pressures. A wide range of information is collected and analysed by network operators and service providers in order to assist in managing the network and in making management decisions concerning the network as a whole and individual users within the network. The scale of some commercial communication networks means that a large number of these decisions must be automated, and many such decisions are made using machine learning models.

The identification of particular customers is a key task often accomplished using machine learning models. For example, with appropriate training data a machine learning model may be trained to identify customers at risk of leaving the network or ceasing to be a customer of the service (churn prediction), customers likely to be most responsive to a particular advertising campaign (targeted advertising) or content (targeted content delivery) or customers most likely to take up particular services (targeted service recommendation).

Many machine learning models currently employed use the similarity between a pair of examples in a dataset as an underlying measure, for example as part of a clustering process or as part of a classification process. In the telecommunications domain, such examples may be network users, and the dataset may be the entire network or a particular subset of the network in question. The "k-means" clustering and "k-nearest neighbour" classifier are examples of clustering and classification algorithms respectively, which use similarity between two examples as a key computational measure.

Computation of similarity between users in a network is thus a key process facilitating the taking of network management decisions through a wide range of machine learning models. Similarity between two network users can be established based on various different factors, and the computation of similarity between users is often specific to a particular application domain. In many application domains, global network features are the key user attributes, and it is most efficient to represent user data numerically, as a vector of attribute values known as a feature vector. Feature vectors can be extracted from network data and any suitable distance function can be used to compute the similarity between two users as represented by their feature vectors. Examples of such distance functions, or metrics, include the Euclidean distance function and the Taxicab distance function.

In other application domains, including for example social network analysis, local interaction data is of greater importance in establishing similarity between users. In such applications, data is represented as a graph, in which each node represents a user and the links or edges between the nodes represent the relationships between the users. Various methods exist for computing the similarity between users from such graphic relationship data. One example is the random walk based method, which can be used to measure the similarity between two nodes in a graph, and hence between the two users represented by those nodes.

In the telecommunications domain, either of the above discussed approaches to calculating similarity can be employed. In a first approach, user feature vectors can be derived from call and/or customer relations management data and an appropriate distance metric can be applied to calculate similarity between users. In a second approach, the social interaction between various users within the network can be extracted from call records data and represented on a call graph, in which each node represents a user and each edge between nodes represents interaction between users. An appropriate analysis technique can then be employed to calculate similarity between users.

In many practical cases, it is desirable to use both of the above representations to compute similarity between customers. Considering for example the case of churn prediction in a telecommunications network, user spending and top up behaviour would be important attributes on which to base a similarity calculation. A feature vector representing spending and top up behaviour can therefore be extracted from the appropriate call and customer relations data for each user and a suitable distance metric used to calculate similarity between users. However, studies have indicated that Quality of Service (QoS) is also a key factor in user churn behaviour. QoS perception is highly individual and subjective, but users having a high degree of psychological similarity may be expected to have similar QoS requirements, and hence similar churn behaviour. It would therefore be useful to calculate user similarity based on psychological factors such as perception, personality, behaviour, attitude, values etc. Such psychological similarity is very difficult to model explicitly, but it can be approximated through calculation of social similarity. It has been shown that in general terms, a higher social similarity between two persons is associated with a higher psychological similarity. Social similarity between two network users can be computed by representing user social interaction on a call graph and calculating similarity using graph analysis methods as discussed above.

Churn prediction is merely one of many examples in which both feature vector and call graph representation would provide useful insight into the computation of similarity between users.

One way of computing user similarity through both feature vector representation and call graph representation is to compute similarity using both representations separately and then take a weighted average of the two similarity values. Considering the case of users x and y, similarity between x and y based on feature vector representation $S_{fv}(x, y)$ and similarity between x and y based on call graph representation $S_{gr}(x, y)$, the combined value of similarity S for users x and y is given by the following formula:

$$S(x,y) = \alpha * S_{fv}(x,y) + (1-\alpha) * S_{gr}(x,y)$$

where $\alpha$ is a weighting factor having any value in the interval (0, 1).

While the above described method is relatively simple, establishing the correct value for the weighting factor α is more complicated. Taking the above discussed example of churn prediction, it is not immediately evident to a network operator or service provider whether more weight should be give to the feature vector based similarity (relating to spending and top up behaviour) or the call graph based similarity (relating to social interaction). One quantitative approach to establishing a weighting factor comprises:

1) For various possible values of α:
a) Compute similarity using the value of α;
b) Train a machine learning model (e.g. churn prediction) using the computed similarity;
c) Test the performance of the trained model on a test data set
2) Select the value of a resulting in the machine learning model which had the best performance on the test data set.

This approach to determining α is reasonable for domains in which the size of the data set does not exceed a certain limit. However, in the telecommunications domain, where a single network operator or service provider may have hundreds of millions of users, the scale of the data set is measured in terabytes, and the above trial and error approach involving training and testing multiple models in order to arrive at a value for a is simply not feasible.

SUMMARY

It is an aim of the present invention to provide a method, apparatus and computer program product which obviate or reduce at least one or more of the disadvantages mentioned above.

According to a first aspect of the present invention, there is provided a method for determining similarity information for users of a network. The method comprises constructing a graph from user interaction data, wherein the graph links users of the network according to their interaction, and weighting links between users according to the strength of interaction between the users. The method further comprises, for each of a plurality of users, identifying from among the other users with whom the user interacts: a maximum similarity user to whom the user is connected via a maximum weight link, and a minimum similarity user to whom the user is connected via a minimum weight link. Finally, the method comprises assembling a plurality of relative similarity triplets, each triplet comprising a user and that user's identified maximum and minimum similarity users.

Aspects of the present invention thus enable the extraction of relative similarity information in the form of relative similarity triplets from data relating to interaction between users. Such relative similarity information may be used in further processing to arrive at other forms of similarity information, including for example absolute similarity information relating to users within the network. This absolute similarity information may have many applications in the management of the network and delivery of content and services to users.

For the purposes of the present specification, user interaction data includes within its scope data concerning all forms of interaction between users that is possible within the network. Such interaction may for example include calls, SMS, social media site interaction etc.

Constructing a graph linking users of the network according to their interaction may comprise linking two users on the graph where a reciprocal interaction is recorded between the users. A reciprocal interaction may for example comprise at least one interaction event between two users initiated by a first of the users and at least one interaction event between the two users initiated by a second of the users. An interaction event may comprise a call, SMS, social media site message or other communication enabled by the network.

According to embodiments of the invention, weighting links between users may comprise assigning a weight to a link between two users according to the proportion of each user's total interaction with network users which is dedicated to the other user. According such embodiments, the percentage of a user's total interaction which is directed towards a second user is considered in establishing a weight to be assigned to the link between the two users. This may for example comprise the percentage of total call time of user i directed towards user j, or the percentage of the total number of calls made by user i which are directed towards user j, and vice versa. In this manner, the weight assigned to a link between two users may reflect the strength of the interaction or social tie between the users. According to some embodiments, this may be used as an approximate measure of social similarity, on the basis that two users with strong social ties are likely to be socially similar.

According to further embodiments, weighting links between users may comprise assigning a weight to a link between two users according to the proportion of the total number of users interacted with by each user that the other user represents. According to such embodiments, the total number of users interacted with by user i or user j is taken into account in establishing the weight assigned to the link between users i and j. Thus if user i interacts with 100 users including user j but user j only interacts with 10 users including user i, then user j represents for user i 1% of his contacts, whereas user i represents for user j 10% of his contacts. In this manner, another measure of the strength of the social interaction between two users may be reflected in the weight assigned to the link between the users, by quantifying the proportion of a total number of contacts represented by a single user.

According to some embodiments, both of the above discussed weighting considerations may be applied in assigning a weight to a link between two users. A weight to be assigned to a link between users i and j may be calculated according to the following formula:

$$w_{i,j} = \frac{1}{(n_i + n_j)} * \left[ \frac{C_{i->j}}{C_i} * n_i + \frac{C_{j->i}}{C_j} * n_j \right]$$

Where: $C_i$ and $C_j$ are the total call duration (or number of calls) generated by users i and j respectively, $C_{i->j}$ and $C_{j->i}$ are the total call duration (or number of calls) generated from user i to user j and from user j to user i respectively, and $n_i$ and $n_j$ are the total number of contacts of user i and user j respectively, where a contact comprises another user within whom user i or user j interacts.

According to some embodiments, the method may further comprise selecting representative triplets from among the plurality of relative similarity triplets. Representative triplets may comprise those triplets for which the relative similarity information contained within the triplet may be asserted most confidently.

According to some embodiments, selecting representative triplets may comprise selecting those triplets in which a difference between the weight of the maximum weight link and the weight of the minimum weight link satisfies a high difference criterion.

A high difference criterion may for example comprise a threshold difference value. In other examples, the high difference criterion may comprise a ranking criterion, in which triplets are ranked according to the weight difference between maximum and minimum weight links, and the top X ranked triplets are selected as representative.

According to further embodiments, selecting representative triplets may comprise selecting triplets of users exhibiting bias behaviour toward at least one of their maximum or minimum similarity users.

According to some embodiments, identifying users exhibiting bias behaviour may comprise, for a user: identifying all of the user links to other users, and removing from consideration the maximum and minimum weight links; and identifying those users for whom the evenness of distribution of remaining link weights is a above a threshold level.

According to some embodiments, identifying those users for whom the evenness of distribution of remaining link weights is above a threshold level may comprise: calculating the entropy of the remaining link weights, and identifying users satisfying a high link weight entropy criterion.

A high link weight entropy criterion may for example comprise a threshold value. In other examples, the high link weight entropy criterion may be a ranking criterion in which triplets are ranked according to their remaining link weight entropy and the top X ranked triplets are selected. In some examples, the remaining link weights may be modified before entropy is calculated, such that the sum of all remaining link weights for a user is 1.

According to further embodiments, selecting representative triplets may comprise: identifying those triplets in which a difference between the weight of the maximum weight link and the weight of the minimum weight link satisfies a high difference criterion; and selecting, from among the identified triplets, triplets of users exhibiting bias behaviour. In this manner, triplets may be filtered by weight difference before representative triplets are selected according to bias behaviour.

According to some embodiments, the method may further comprise learning a distance metric from the assembled relative similarity triplets.

In some examples, learning a distance metric may comprise applying the assembled relative similarity triplets as input constraints to a learning method for learning a distance metric. In some examples, selected representative triplets may be applied as input data to a learning method for learning a distance metric.

According to some embodiments, the method may further comprise calculating similarity between users of the network, wherein calculating similarity comprises applying the learned distance metric to a numerical representation of user features.

A numerical representation of user features may for example comprise a feature vector.

According to another aspect of the resent invention, there is provided a computer program product configured, when run on a computer, to carry out the method of the first aspect of the present invention. The computer program product may be stored on a computer-readable medium, or it could, for example, be in the form of a signal such as a downloadable data signal provided from an Internet website, or it could be in any other form.

According to another aspect of the present invention, there is provided an apparatus for determining similarity information for users of a network from user interaction data. Embodiments of the apparatus comprise a graphic unit configured to construct a graph from user interaction data, wherein the graph links users of the network according to their interaction, a weighting unit configured to assign weights to links between users according to the strength of interaction between the users, and an identifying unit configured to identify, for each of a plurality of users: a maximum similarity user to whom the user is connected via a maximum weight link, and a minimum similarity user to whom the user is connected via a minimum weight link. Embodiments of the apparatus further comprise an assembling unit, configured to assemble a plurality of relative similarity triplets, each triplet comprising a user and that user's identified maximum and minimum similarity users.

Embodiments of the apparatus may further comprise a selecting unit, configured to select representative triplets from among the plurality of relative similarity triplets assembled by the assembling unit.

Embodiments of the apparatus may further comprise a learning unit, configured to learn a distance metric from the relative similarity triplets assembled by the assembling unit.

Embodiments of the apparatus may further comprise a calculating unit, configured to calculate similarity between users of the network by applying the distance metric learned in the learning unit to a numerical representation of user features.

According to another aspect of the present invention, there is provided a method for calculating similarity between users of a network, the method comprising applying a distance metric to a numerical representation of user features wherein the distance metric is learned using information determined from user interaction data.

Aspects of the present invention thus integrate insight from interaction data and from a numerical data representation to arrive at a measure of similarity between network users. The information determined from user interaction data may comprise relative similarity information, which may be in the form of relative similarity triplets. The relative similarity triplets may be determined from user interaction data using a method in accordance with the first aspect of the present invention. The distance metric may be learned using a suitable machine learning technique.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
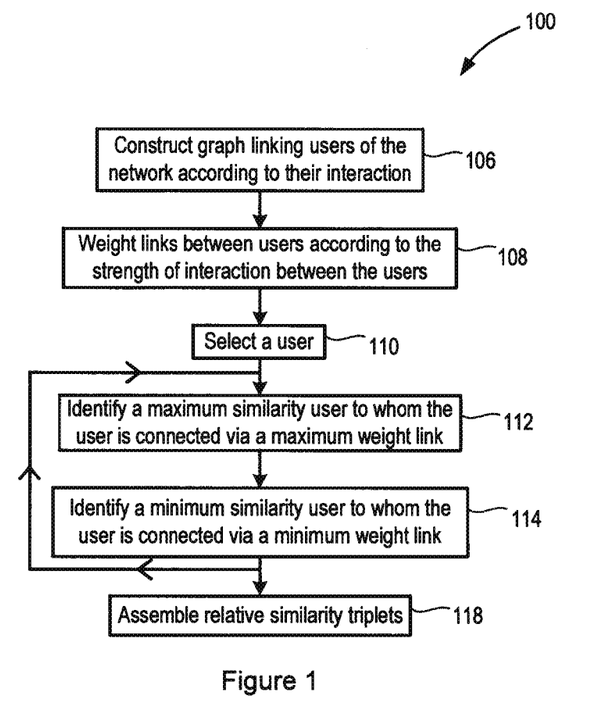
FIG. 1 shows a flow chart illustrating steps in a method for determining similarity information for users of a network.

FIG. 1 illustrates steps in a method 100 for determining similarity information for users of a network in accordance with an aspect of the present invention. The network may be a communication network and in one example of the invention the network may be a telecommunications network. The following description illustrates examples of the invention with reference to a telecommunications network. However, it will be appreciated that the invention is equally applicable to other types of communication network.

With reference to FIG. 1, a first step 150 of the method 100 comprises constructing a graph from user interaction data, wherein the graph links users of the network according to their interaction. Links between the users are then weighted in step 108 according to the strength of interaction between the users. The method then proceeds to conduct certain steps for each of a plurality of users, selecting a user at step 110. For each selected user, the method proceeds, at step 112, to identify a maximum similarity user to whom the user is connected via a maximum weight link. Subsequently, at step 114, the method identifies a minimum similarity user, to whom the user is connected via a minimum weight link. These identification steps are conducted for each of a plurality of users. Finally, at step 118, the method assembles a plurality of relative similarity triplets, wherein each triplet comprises a user and that user's identified maximum and minimum similarity users.

The illustrated method thus enables the extraction of relative similarity data, in the form of relative similarity triplets, from user interaction data. Each of the assembled relative similarity triplets provides similarity information for a user relative to other users with whom the user interacts, thus providing local insight into the social similarity of users. According to some examples of the invention, this determined relative similarity information may be further processed, and used to generate absolute similarity information, in the form of a measure of similarity between users of the network who may or may not be connected. An example of such further processing is described in detail below, with reference to FIGS. 3a, 3b, 4 and 5.

Referring again to FIG. 1, in a first step 106 of the method 100, a graph is constructed from user interaction data, which graph links users according to their interaction. In a telecommunications network, interaction between users typically takes the form of calls placed or messages sent between users. For ease of illustration, the following discussion focuses on calls placed between users, although other forms of interaction may also be assessed. In order to construct the interaction graph, which in further discussion is referred to as a call graph, the relevant interaction data is first extracted from the call data records (CDR) of the network provider. This data may include which users placed calls and which users those calls were directed to, frequency and duration of calls made by one user to another, date and time of first calls made between users etc. Based on this information, a call graph is constructed in which each user is represented by a node and interaction between users is represented by links or edges between the nodes. In the present example, it is envisaged that a link is created between nodes on the call graph only in the event of a reciprocal call between the two users represented by the nodes. A reciprocal call means for example that user i has called user j and user j has called user i. In this manner, each link created on the graph represents a social relationship of greater or lesser importance between the two connected users. The completed graph thus captures the social relationship characteristics of the underlying communications network. Each user to whom a particular user is linked on the call graph represents a contact of that particular user.

Following construction of the call graph the method proceeds, at step 108, to assign weights to the links between users according to the strength of interaction between the users. This step involves making an assessment of the strength of interaction between users. Two considerations are presented below on the basis of which the strength of user interaction may be assessed, each consideration providing insight into the strength of interaction between a pair of users, and hence the importance of the social relationship between those users. The first consideration is the percentage of a first user's total interaction time which is directed towards a particular second user. The second consideration is the proportion represented by a second user of the total number of contacts that a first user interacts with. Each of these considerations is illustrated with respect to a notional pair of users i and j below.

Considering the strength of a social connection between user i and user j, it may be considered that i has a stronger social connection with j if i calls j more often, or for a greater total length of time, than i calls to any other of his contacts. Similarly, j may be considered to have stronger social ties with i than with any of his other contacts if j calls i more often, or for a greater total length of time, than j calls any of his other contacts. The total number of contacts of i and j also provides an indication of the importance of the social ties between i and j. For example, if i calls 100 different users, and thus has 100 contacts including j, then user j represents for user i 1% of his contacts. However, if i calls 10 different users, and thus has 10 contacts including j, then user j represents 10% of user is contacts.

Either or both of the above considerations may be used to assess the strength of interaction between users, and hence inform the weight assigned to a link between users. According to the present example, by combining the above two considerations, considerable insight into the strength of the social tie between two users can be attained. For example, in a situation where i has 100 contacts including j, and i calls j for 40% of the time, i is directing 40% of his calls to only 1% of his contacts, suggesting a strong social connection. However, if user i has only 10 contacts, such that user j represents 10% of is contacts, the social tie does not appear to be so strong.

The following formula for calculating the weight to be assigned to a link between users i and j integrates the two considerations discussed above:

$$w_{i,j} = \frac{1}{(n_i + n_j)} * \left[ \frac{C_{i->j}}{C_i} * n_i + \frac{C_{j->i}}{C_j} * n_j \right]$$

Where: $C_i$ and $C_j$ are the total call duration (or number of calls) generated by users i and j respectively,
$C_{i->j}$ and $C_{j->i}$ are the total call duration (or number of calls) generated from user i to user j and from user j to user i respectively, and
$n_i$ and $n_j$ are the total number of contacts of user i and user j respectively.

This formula takes account of the total number of contacts of i and j, total number or duration of calls made by i and j and total number or duration of calls made by i to j and by j to i. The factor $1/(n_i+n_j)$ normalises the weight, keeping the value in the interval (0, 1).

Having weighted the links in the call graph according the above described procedure, the method proceeds to consider a plurality of individual users. The plurality of users may include all users in the network or may for example include merely a subset of network users. A user is selected for consideration in step 110. A maximum similarity user is identified from among the selected user's contacts in step 112, and a minimum similarity user is identified from among the selected user's contacts in step 114. The maximum and minimum similarity users are identified by considering the link weights of all links between the selected user and the users to whom the selected user is connected. The maximum similarity user is that user to whom the selected user is connected with a maximum link weight. The most heavily weighted of all a user's links is his maximum link weight, and thus the user to which a selected user is connected with his most heavily weighted link is the selected user's maximum similarity user. Conversely, the minimum similarity user is that user to whom the selected user is connected with a minimum link weight. The least heavily weighted of all a user's links is his minimum link weight, and thus the user to which a selected user is connected with his least heavily weighted link is the selected user's minimum similarity user. If user i is under consideration, then steps 112 and 114 result in the identification of a maximum similarity user j and a minimum similarity user k.

The identification process of steps 112 and 114 is conducted for each of a plurality of users within the network. As discussed above, this plurality may include all or a subset of users within the network. The present example discusses a situation in which all users within the network are assessed, but it will be appreciated that other examples may be envisaged in which a subset of users within the network are considered in this manner.

The identifying of maximum and minimum similarity users at steps 112 and 114 permits the assembly, at step 118, of a plurality of relative similarity triplets. Each triplet is formed of the selected user and his maximum and minimum similarity users. Thus, continuing the example of user i, the triplet relating to user i is (i, j, k). This triplet indicates that user i has strongest social ties among his contacts with user j and weakest social ties among his contacts with user k. As discussed above, strong social ties may be associated with strong social similarity, and thus the triplet indicates that user i is more socially similar to user j than user i is to user k. It will be appreciated that the similarity information provided by such triplets is relative, the similarity of user i to user j being indicated not in absolute form but with reference to the similarity between user i and user k, hence the designation "relative similarity triplets". A relative similarity triplet may be generated for each user considered in steps 112 and 114, thus in the present example, for a telecommunications network having n users, n relative similarity triplets may be assembled. As noted above, a telecommunications network may comprise of the order of millions of users, and hence millions of relative similarity triplets may be assembled in this manner. Each of these triplets may be further processed and converted into a constraint for additional machine learning steps, as discussed in greater detail below with reference to FIGS. 3a, 3b, 4 and 5.

The above description illustrates how the method of FIG. 1 enables the extraction of relative similarity information concerning users of the network from interaction data relating to those users.

Figure 2:
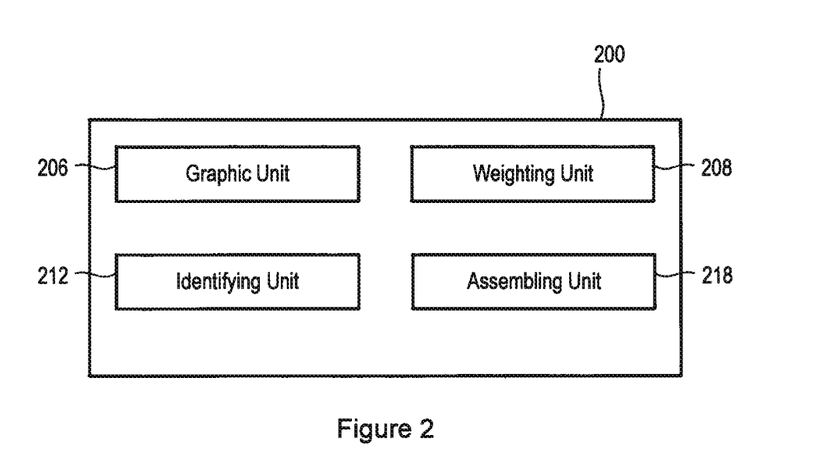
FIG. 2 illustrates an apparatus for determining similarity information for users of a network.

The method 100 of FIG. 1 may be realised by a computer program which may cause a system, processor or apparatus to execute the steps of the method 100. FIG. 2 illustrates functional units of an apparatus 200 which may execute the steps of the method 100, for example according to computer readable instructions received from a computer program. The apparatus 200 may for example comprise a processor, a system node or any other suitable apparatus.

With reference to FIG. 2, the apparatus 200 comprises a graphic unit 206, a weighting unit 208, an identifying unit 212 and an assembling unit 218. It will be understood that the units of the apparatus are functional units, and may be realised in any appropriate combination of hardware and/or software.

According to an embodiment of the invention, the graphic unit 206, weighting unit 208, identifying unit 212 and assembling unit 218 may be configured to carry out the steps of the method 100 substantially as described above. The graphic unit 206 may be configured to construct a call graph from interaction data extracted from the network CDR data. The weighting unit 208 may be configured to assign weights to links in the graph according to the strength of interaction between the units. This weighting process may for example employ the weighting formula discussed above. The identifying unit 212 may be configured to identify maximum and minimum similarity users from among a user's contacts for each of a plurality of users within the network. The plurality may comprise all users within the network or a subset of network users. The assembling unit 218 may be configured to assemble relative similarity triplets comprising a user and that user's maximum and minimum similarity users.

Figure 3A:
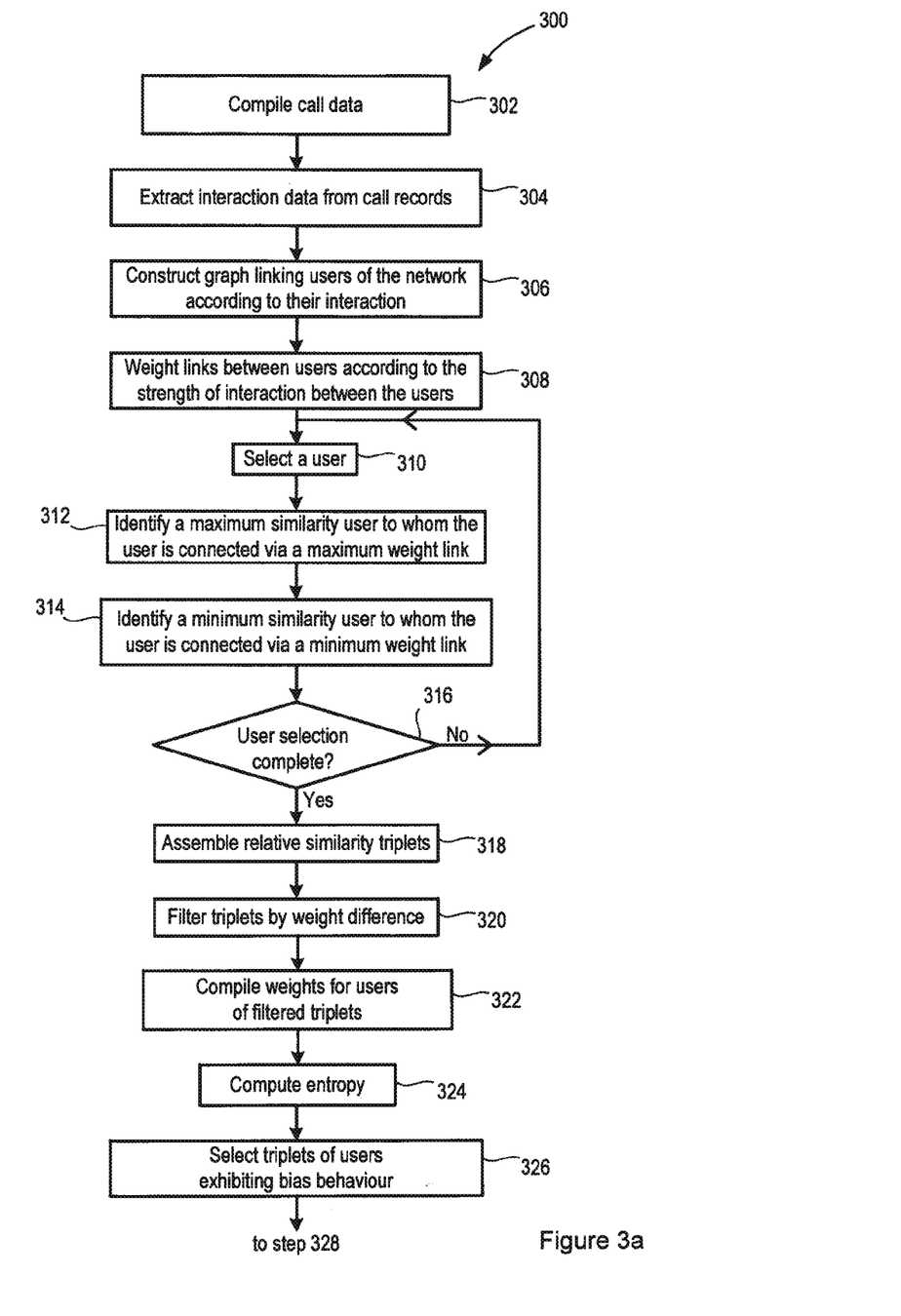
FIGS. 3a and 3b show a flow chart illustrating steps in another example of a method for determining similarity information for users of a network.
Figure 3B:
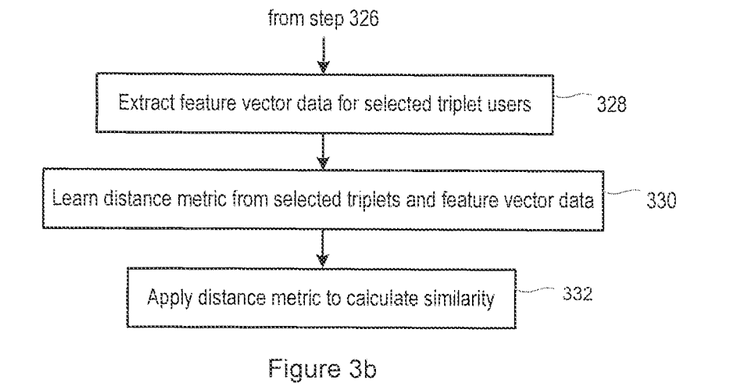

FIGS. 3a and 3b illustrate steps in a method 300 for determining similarity information for users in a network according to another embodiment of the present invention. The method 300 comprises additional steps compared to method 100, which may be conducted as part of processing the determined relative similarity information in order to enable calculation of absolute similarity information for users within the network. The method 300 is described bellow with respect to application in a telecommunications network, although it will be appreciated that the method may also be applied in other types of communication network.

In a first step 302 of the method 300 call data records are compiled for the network, allowing in step 304 the extraction of interaction data from those call data records. As discussed above with reference to method 100, the interaction data may comprise which users placed calls and which users those calls were directed to, frequency and duration of calls made by one user to another, date and time of first calls made between users etc. Following extraction of the relevant data, a call graph is constructed in step 306 and the call graph links are weighted in step 308 according to the strength of interaction between the users. These steps are conducted substantially as described above with respect to steps 106 and 108 of method 100, and reference is made to this earlier description for the detail of how these steps may be conducted.

Once the weighted call graph is complete, a user is selected in step 310 for identification of maximum and minimum similarity users from among that user's contacts in steps 312 and 314, again substantially as described above with respect to steps 110, 112 and 114 of method 100. Reference is again made to the earlier description for the detail of these steps.

The process of selecting a user may be random or may include identifying users within a particular subset of the network as designated by the network operator or a network service provider. In the present example it is assumed that all users within the network are to be considered in steps 312 and 314. The method checks at step 316 whether user selection is complete, which may involve checking that all users within the designated subset have been considered, or as in the present example, that all users within the network have been considered. Once the selection is complete, the relative similarity triplets are assembled in step 318, again substantially as described above with reference to step 118 of method 100.

It will be appreciated that in some examples of the methods 100 and 300, assembly of a user relative similarity triplet may take place immediately following identification of maximum and minimum similarity users, such that steps 110 to 118, or steps 310 to 318 take place substantially concurrently for different users.

On completion of steps 302 to 318, a plurality of relative similarity triplets has been assembled, providing insight into the relative social similarity between connected users within the network. This relative similarity information may have many practical uses, and in the present example, this information is applied to the learning of a distance metric that permits calculation of absolute similarity measures.

As discussed earlier in the present specification, a distance metric may be applied to numerical representations of user attribute values in order to calculate a measure of similarity between two users within a network. This numerical representation is typically a vector of user attribute values, known as a feature vector. Various distance metrics exist and are discussed earlier in the present disclosure. It is also possible to learn a distance metric from training data. The learning of a distance metric is a convex programming problem that requires:

a) Data in feature vector form (each data point represented as a fixed length feature vector), and
b) Additional information that qualitatively describes the similarity between some of the data points.

The additional information referred to in point (b) acts as a series of constraints to enable learning of the metric. This data is often provided by a user of the distance metric or extracted from the data set using some reasonable assumption.

According to the present example, the relative similarity triplets assembled in step 318 (or step 118 of method 100) are used to provide the necessary qualitative similarity information to enable learning of a distance metric for the network under consideration. The relative similarity triplets provide information of the form "user i is more similar to user j than to user k". This relative similarity information is a type of qualitative similarity information which may be converted into constraints for the learning of a distance metric. It has already been discussed that feature vectors for network users can be assembled from network call records and customer relations data. By using the relative similarity triplets assembled according to the present invention in combination with feature vectors for the users concerned, a distance metric applicable to the feature vectors may be learned, which metric incorporates the relative similarity information conveyed by the triplets and thus encapsulates the insight gained from assessing social similarity of the network users through graphic representation.

A distance metric learned in this manner may be used in combination with feature vector data for network users to calculate measures of absolute similarity between network users. These absolute similarity measures incorporate not only the information conveyed through feature vector representation of the users but also, via the learned distance metric, information conveyed through the graphic representation of user interaction.

As mentioned above, each relative similarity triplet may be converted into a constraint for the learning of a distance metric that will permit calculation of absolute similarity measures for network users. However, according to the present example, representative triplets are first selected to be used in the further processing steps. Considering the present example of a telecommunications network in which a relative similarity triplet is assembled for each user, a number n of relative similarity triplets of the order of many millions may be assembled. Even for distance metric learning algorithms whose processing time increases linearly with the number of constraints, the processing time for an algorithm subjected to many millions of constraints may be unacceptably long. The method 300 thus proceeds in steps 320 to 326 to select from among all the triplets assembled in step 318 representative triplets for further processing.

The relative similarity triplets convey information of the form "user i is more similar to user j than to user k". It is desirable to select as constraints for distance metric learning those triplets for which this relative similarity information can be asserted most confidently, as these will form the most effective constraints for the distance metric learning process. Such triplets are referred to as representative triplets in the following discussion. A first method for identifying representative triplets is to filter the triplets by link weight difference. This filtering process takes place in step 318 of the method 300 and is illustrated in the example below considering triplets (i, j, k) and (m, n, l) assembled in step 318. It is assumed for the purpose of the present example that the link weights between (i, j) and (i, k) are 0.9 and 0.1 respectively and that the link weights between (m, n) and (m, l) are 0.9 and 0.8 respectively. The difference in maximum and minimum link weights in triplet (i, j, k) is 0.8, whereas the difference in maximum and minimum link weights in triplet (m, n, l) is much smaller, being only 0.1. It is therefore possible to assert that user i and user j are more similar to each other than user i and user k with more confidence than that user m and user n are more similar to each other than user m and user l. It is therefore desirable to select triplet (i, j, k) for distance metric learning rather than triplet (m, n, l). This method may be summarized as selecting triplets having a large difference between $w_{i,j}$ and $w_{i,k}$.

In some examples, a threshold value for the difference in weight between the maximum and minimum weight links in a triplet may be established, such that all triplets having a weight link difference above this threshold value are considered to be representative triplets and are selected for further processing. In other examples, a ranking criterion may be imposed, such that the triplets are ranked according to their link weight difference and the top X ranked triplets are selected for further processing. This ranking process may be particularly efficient where a fixed number of representative triplets is required.

A second method for identifying representative triplets is to identify those triplets in which a user exhibits bias behaviour towards either or both of his maximum and minimum similarity users. This identifying process takes place in steps 322 to 326 of the method 300 and is illustrated below with respect to example users A, B, C and D.

According to the present illustrative example, users A, B, C and D are each considered to have five contacts and to be linked to those contacts with the link weights shown in Table 1 below:

TABLE 1

| | Edge weight between user and corresponding contacts | | | | |
|---|---|---|---|---|---|
| User | Contact1 | Contact2 | Contact3 | Contact4 | Contact5 |
| A | 0.8 | 0.78 | 0.79 | 0.77 | 0.3 |
| B | 0.7 | 0.21 | 0.23 | 0.22 | 0.2 |
| C | 0.6 | 0.35 | 0.36 | 0.35 | 0.1 |
| D | 0.9 | 0.7 | 0.5 | 0.8 | 0.4 |

For each of users A, B, C and D, contact 1 can be seen to be the maximum similarity user, connected with the maximum link weight, and contact 5 can be seen to be the minimum similarity user, connected with the minimum link weight. The following triplets can therefore be assembled: (A, 1, 5); (B, 1, 5); (C, 1, 5); (D, 1, 5).

According to the first method for identifying representative triplets (step 320), each of these triplets has an equal score, the difference between the maximum and minimum link weights being 0.5 for each triplet. However, according to the second method for identifying representative triplets, evidence of user bias is identified from consideration of the link weights by which the user is connected to his contacts.

Considering first user A, it can be seen that A has almost equal weighted links for all his contacts except his Contact 5, meaning that A demonstrates a negative bias towards his Contact 5. Similarly, user B has almost equally weighted links except to his Contact 1, meaning that B demonstrates a positive bias towards his Contact 1. User C has almost equally weighted links except for both Contacts 1 and 5, meaning that user C demonstrates a dual bias (positive bias towards his Contact 1 and negative bias towards his Contact 5). User D does not demonstrate any kind of negative or positive bias towards any of his contacts.

The presence of user bias towards either of his maximum or minimum similarity users reinforces the assertion that the biased user is more similar to his maximum similarity user than to his minimum similarity user. An absence of user bias provides no further information concerning the accuracy of the relative similarity assertion. The reinforcement provided by biased behavior illustrates the desirability of selecting as representative triplets for further processing those triplets in which a user exhibits biased behavior. The following discussion illustrates how such users may be identified according to the example method 300.

Users exhibiting biased behavior are identified by assessing the evenness of distribution of the link weights of their remaining contacts, once the weights of the maximum and minimum similarity users have been removed from consideration. In a first identifying step 322, the link weights of users to be considered are assembled, and the maximum and minimum link weights are removed from consideration. For the remaining contacts of each user, the contact link weights are modified such that the sum of all the weights for each user is 1. This modification normalizes the link weights, allowing comparison between different users. Modification may be conducted according to the following formula:

$$w_{i,m}^{modified} = \frac{1}{\sum_{m=1}^{N} w_{i,m}} * w_{i,m}$$

where:
i is the user under consideration;
N is the number of remaining contacts after the maximum and minimum similarity users have been removed from consideration;
m is the remaining contact for which weight is being modified
$w_{i,m}$ is the original link weight between i and m; and
$w_{i,m}^{modified}$ is the modified link weight.

Modified link weights for remaining contacts are shown in parentheses in table 2 below.

Having modified the remaining link weights, the method proceeds at step 324 to compute the entropy of the remaining link weights, using the modified values to aid comparison, and according the following formula:

$$H(i) = -\sum_{m=1}^{N} w_{i,m}^{modified} \log_e (w_{i,m}^{modified})$$

where:
H(i) is the entropy of the modified link weight value.

Calculating the entropy of the remaining link weights provides a quantitative measure of the evenness of distribution of the remaining link weights. Entropy of remaining link weights is provided for example users A, B, C and D in Table 2 below:

TABLE 2

| User | Edge weight between user and corresponding contacts (modified weights) | | | | | Entropy |
|---|---|---|---|---|---|---|
| | Contact1 | Contact2 | Contact3 | Contact4 | Contact5 | |
| A | 0.8 | 0.78 (0.333) | 0.79 (0.337) | 0.77 (0.329) | 0.3 | 1.098 |
| B | 0.7 | 0.21 (0.318) | 0.23 (0.348) | 0.22 (0.333) | 0.2 | 1.097 |
| C | 0.6 | 0.35 (0.330) | 0.36 (0.339) | 0.35 (0.330) | 0.1 | 1.098 |
| D | 0.9 | 0.7 (0.35) | 0.5 (0.25) | 0.8 (0.4) | 0.4 | 1.080 |

It can be seen from Table 2 above that the calculated entropy values reflect the presence or absence of bias behaviour in the users as discussed above. Users A, B and C, all of which demonstrate bias behaviour towards their maximum and/or minimum similarity users, have higher entropy values for the remaining contacts than user D, which does not demonstrate bias behaviour. Computing the entropy of remaining link weights thus allows, at step 326 the identification of triplets in which users exhibit bias behaviour. This identification may be achieved by setting a threshold value for entropy, and selecting as representative triplets all triplets having an entropy value over the threshold value. Alternatively, triplets may be ranked according to their entropy value, and the top X triplets may be selected as exhibiting bias behaviour, and thus being representative triplets for further processing.

According to the example illustrated in FIG. 3a, representative triplets are selected according to maximum link weight difference and bias behaviour, by first filtering the triplets according to maximum link weight difference in step 320 and then identifying triplets of users exhibiting bias behaviour in steps 322 to 326. However, it will be appreciated that in other examples, either one of these processes for identifying representative triplets may be employed alone.

The representative triplets selected according to steps 320 to 326 may then be used as constraints in the learning of a distance metric for the telecommunications network as illustrated in FIG. 3b. As discussed above, learning a distance metric requires data points in feature vector form in addition to qualitative similarity information concerning the data points. Having assembled qualitative similarity information in the form of the representative relative similarity triplets, the method 300 therefore proceeds at step 328 to extract feature vector data for all users appearing in relative similarity triplets which have been identified as representative. Thus for a representative relative similarity triplet (i, j, k), feature vectors $\vec{x}_i, \vec{x}_j, \vec{x}_k$ are extracted and assembled with feature vectors of other users appearing in representative triplets into a feature vector training data set $X_{train}$. The triplet (i, j, k) is assembled with other relative similarity triplets into a set of training constraints $P_{train}$. $X_{train}$ and $P_{train}$ are then employed in step 330 to learn a distance metric $d(\vec{x}_i, \vec{x}_j)$. Learning the distance metric from $X_{train}$ and $P_{train}$ can be accomplished by framing the task as an optimization problem which may be solved according to algorithms known in the art. Once learned, the distance metric $(\vec{x}_i, \vec{x}_j)$ is used in step 332 to calculate similarity between any members of the network by applying the distance metric to feature vectors representing any two network users to be considered.

Figure 4:
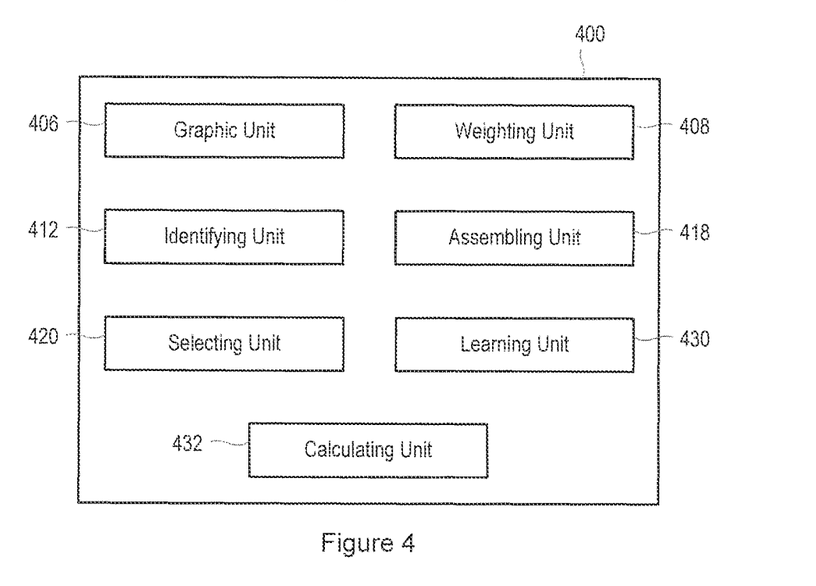
FIG. 4 illustrates another example of an apparatus for determining similarity information for users of a network.

The method 300 of FIGS. 3a and 3b may be realised by a computer program which may cause a system, processor or apparatus to execute the steps of the method 300. FIG. 4 illustrates functional units of an apparatus 400 which may execute the steps of the method 300, for example according to computer readable instructions received from a computer program. The apparatus 400 may for example comprise a processor, a system node or any other suitable apparatus.

With reference to FIG. 4, the apparatus 400 comprises a graphic unit 406, a weighting unit 408, an identifying unit 412, an assembling unit 418, a selecting unit 420, a learning unit 430 and a calculating unit 432. It will be understood that the units of the apparatus are functional units, and may be realised in any appropriate combination of hardware and/or software.

According to an embodiment of the invention, the graphic unit 406, weighting unit 408, identifying unit 412 and assembling unit 418 may be configured substantially as described above with respect to apparatus 200 to carry out steps 302 to 318 of the method 300. The selecting unit 420, learning unit 430 and calculating unit 432 may be configured to carry out steps 320 to 332 of the method 300.

According to one embodiment, the selecting unit 420 may be configured to select representative triplets from the relative similarity triplets assembled by the assembling unit 418. Selection may take place according to maximum link weight difference (step 320 of method 300) and/or demonstration of bias behaviour (step 322 to 326 of method 300). The learning unit 430 may be configured to learn a distance metric from the selected triplets and feature vector data, and the calculating unit 432 may be configured to calculate similarity between network users by applying the learned distance metric.

The above examples illustrate how aspects of the present invention provide methods for determining similarity information for users of a network. In some embodiments of the invention, the similarity information comprises relative similarity information, which is extracted in the form of relative similarity triplets from user interaction data represented graphically. In other embodiments, this extracted relative similarity information may be further processed by being used to learn a distance metric, which metric may then be applied to feature vector representations of user data to calculate absolute similarity information for users within the network. The present invention thus provides not only a method by which relative similarity information may be extracted from user interaction data, but also a method by which such relative similarity information may be used in an integrated approach to determining absolute similarity between network users.

Figure 5:
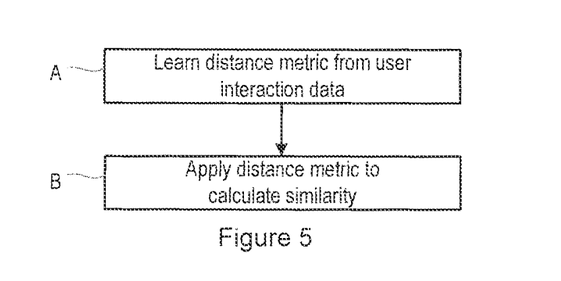
FIG. 5 shows a flow chart illustrating stages in a method for calculating similarity between users of a network.

The integrated approach to calculating similarity between network users provided by aspects of the present invention is summarised in FIG. 5. In a first stage A of the approach, a distance metric is learned from user interaction data represented graphically. In a second stage B, the learned distance metric is applied to user data in feature vector form to generate measures of similarity between network users. In this manner, the local social similarity insight gained from graphically represented user interaction data is incorporated into a learned distance metric which may then be applied to global data captured in feature vector form to provide a measure of similarity which integrates both local and global insight, gained from graphical and numerical representation of data. Through the provision of a method enabling extraction of relative similarity information from user interaction data, aspects of the present invention enable a genuinely integrated solution to the problem of incorporating insight from numerical and graphical data representation, avoiding the need for time consuming trial and error analysis to find a weighting factor for combining separately obtained similarity values.

The similarity values calculated according to the learned distance metric may be used in a wide variety of applications relating to network management. In one example, the similarity values may be used for training a variety of machine learning models which employ similarity between data points as an underlying measure. Examples of such machine learning models include the k-nearest neighbor classifier, support vector machines and information retrieval. The calculated similarity values may also be used to address various network management problems including:

i) Clustering network users into meaningful segments (for example using the k-means or other algorithms);

ii) Classifying users according to their potential to churn or their network influence (for example using the k-nearest neighbor classifier and similarities among users); and/or iii) Identifying target customers for a new advertising campaign. This may for example involve identifying those customers who have responded well to the same campaign in the past or in a different geographical region, and then targeting the new campaign to customers who are similar to those customers who responded well to the earlier campaign. The similar customers may be identified using the methods described in the present specification.

In other examples, similarity values calculated according to aspects of the present invention may be used in the delivery of targeted content or services to users, for example via a recommendation engine. This may involve delivering or recommending appropriate content to users based on their similarity to other users, or delivering content to users in a particular format. Similarity of a user to other users who have required or requested content in a specific format may indicate that that format should be made available to the user. In further examples, particular services or resource allocations may be offered or made available to users based upon their similarity to other users as calculated according to aspects of the present invention.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method executed by a processor for calculating similarity information for users of a network, the method comprising:
   constructing a graph from user interaction data, wherein the graph links the users of the network according to their interaction;
   weighting links between the users according to strength of interaction between the users;
   for each of a plurality of users, identifying from among other users with whom a user interacts:
   a maximum similarity user to whom the user is connected via a maximum weight link, and
   a minimum similarity user to whom the user is connected via a minimum weight link;

assembling a plurality of relative similarity triplets, each triplet comprising a user, that user's identified maximum similarity user connected via a maximum weight link to that user, and that user's identified minimum similarity user connected via a minimum weight link to that user;

calculating, for each of the assembled plurality of relative similarity triplets, a difference between a weight of the maximum weight link connecting the user to that user's identified maximum similarity user and a weight of the minimum weight link connecting the user to that user's identified minimum similarity user;

selecting representative triplets from among the assembled plurality of relative similarity triplets for which the calculated difference between the weight of the maximum weight link and the weight of the minimum weight link satisfies a threshold difference value;

selecting triplets of users exhibiting bias behaviour towards at least one of their maximum or minimum similarity users:

identifying all of the user links to the other users, and removing from consideration the maximum and minimum weight links; and identifying those users for whom the evenness of distribution of remaining link weights is above a threshold level, determining a distance metric from the selected representative triplets using a machine learning model; and applying the determined distance metric to a numerical representation of user features to calculate similarity between the users of the network.

2. The method as claimed in claim 1, wherein weighting links between users comprises assigning a weight to a link between a first user and a second user according to what proportion of the first user's total interaction with network users is dedicated to the second user and what proportion of the second user's total interaction with network users is dedicated to the first user.

3. The method as claimed in claim 1, wherein weighting links between users comprises assigning a weight to a link between a first user and a second user according to what proportion of the total number of users interacted with the first user is represented by the second user and what proportion of the total number of users interacted with the second user is represented by the first user.

4. The method as claimed in claim 1, wherein selecting representative triplets comprises selecting those triplets in which the calculated difference is one of a number of top-ranked differences among the triplets.

5. The method as claimed in claim 1, wherein identifying those users for when the evenness of distribution of remaining link weights is above a threshold level comprises:
calculating entropy of the remaining link weights, and
identifying users satisfying a high link weight entropy criterion.

6. The method as claimed in claim 1, wherein selecting representative triplets further comprises:
identifying those triplets in which the calculated difference between the weight of the maximum weight link and the weight of the minimum weight link satisfies a high difference criterion; and
selecting, from among the identified triplets, triplets of users exhibiting bias behaviour.

7. The method as claimed in claim 1, wherein the distance metric represents similarity between the users of the network.

8. The computer program product configured, when run on a computer, to carry out the method of claim 1.

9. A non-transitory apparatus for calculating similarity information for users of a network, the apparatus comprising:

a graphic unit configured to construct a graph from user interaction data, wherein the graph links the users of the network according to their interaction;

a weighting unit configured to assign weight links between the users according to strength of interaction between the users;

an identifying unit configured to identify, for each of a plurality of users:
a maximum similarity user to whom the user is connected via a maximum weight link, and
a minimum similarity user to whom the user is connected via a minimum weight link;

assembling a plurality of relative similarity triplets, each triplet comprising a user, that user's identified maximum similarity user connected via a maximum weight link to that user, and that user's identified minimum similarity user connected via a minimum weight link to that user;

calculating, for each of the assembled plurality of relative similarity triplets, a difference between a weight of the maximum weight link connecting the user to that user's identified maximum similarity user and a weight of the minimum weight link connecting the user to that user's identified minimum similarity user;

selecting representative triplets from among the assembled plurality of relative similarity triplets for which the calculated difference between the weight of the maximum weight link and the weight of the minimum weight link satisfies a threshold difference value;

selecting triplets of users exhibiting bias behaviour towards at least one of their maximum or minimum similarity users;

identifying all of the user links to the other users, and removing from consideration the maximum and minimum weight links; and identifying those users for whom the evenness of distribution of remaining link weights is above a threshold level, determining a distance metric from the selected representative triplets using a machine learning model; and applying the determined distance metric to a numerical representation of user features to calculate similarity between the users of the network.

10. The non-transitory apparatus as claimed in claim 9, wherein the distance metric represents similarity between the users of the network.

11. A method executed by a processor for calculating similarity information for users of a network, the method comprising:

constructing a graph from user interaction data, wherein the graph links the users of the network according to their interaction;

weighting links between the users according to strength of interaction between the users;

for each of a plurality of users, identifying from among other users with whom a user interacts:
a maximum similarity user to whom the user is connected via a maximum weight link, and
a minimum similarity user to whom the user is connected via a minimum weight link;

assembling a plurality of relative similarity triplets, each triplet comprising a user that user's identified maximum similarity user connected via a maximum weight link to that user, and that user's identified minimum similarity user connected via a minimum weight link to that user;

calculating, for each of the assembled plurality of relative similarity triplets, a difference between a weight of the maximum weight link connecting the user to that user's identified maximum similarity user and a weight of the minimum weight link connecting the user to that user's identified minimum similarity user;

selecting representative triplets from among the assembled plurality of relative similarity triplets for which the calculated difference between the weight of the maximum weight link and the weight of the minimum weight link satisfies a threshold difference value;

selecting triplets of users exhibiting bias behaviour towards at least one of their maximum or minimum similarity users;

identifying all of the user links to the other users, and removing from consideration the maximum and minimum weight links; and identifying those users for whom the evenness of distribution of remaining link weights is above a threshold level, determining a distance metric from the selected representative triplets using a machine learning model; and applying the determined distance metric to a numerical representation of user features to calculate similarity between the users of the network.

* * * * *